United States Patent
Kim et al.

(10) Patent No.: US 6,835,676 B2
(45) Date of Patent: Dec. 28, 2004

(54) FIRE-RESISTANT COMPOSITE PANEL AND FIRE-RESISTANT DECORATIVE COMPOSITE PANEL USING THE SAME

(75) Inventors: Kwang-Min Kim, Cheongju (KR); Wan-Ho Song, Taejeon (KR); Hyoung-Yool Kim, Taejeon (KR)

(73) Assignee: LG Chem, Ltd., Seoul (KR)

( * ) Notice: Subject to any disclaimer, the term of this patent is extended or adjusted under 35 U.S.C. 154(b) by 247 days.

(21) Appl. No.: 10/220,477

(22) PCT Filed: Dec. 28, 2001

(86) PCT No.: PCT/KR01/02292
§ 371 (c)(1),
(2), (4) Date: Aug. 28, 2002

(87) PCT Pub. No.: WO02/053373
PCT Pub. Date: Jul. 11, 2002

(65) Prior Publication Data
US 2003/0124397 A1 Jul. 3, 2003

(30) Foreign Application Priority Data
Dec. 29, 2000 (KR) .......................................... 2000-85422
Nov. 9, 2001 (KR) .......................................... 2001-69635

(51) Int. Cl.[7] ................................................ B32B 5/16
(52) U.S. Cl. ..................... 442/70; 442/136; 442/172; 442/180; 442/181; 442/247; 442/252; 442/255; 442/268; 428/328; 428/340; 428/920; 428/921

(58) Field of Search .......................... 442/70, 136, 172, 442/180, 181, 252, 247, 255, 268, 340; 428/301.4, 328, 340, 920, 921

(56) References Cited

U.S. PATENT DOCUMENTS 6,333,280 B1 * 12/2001 Hashimoto et al. ........... 442/70
6,410,122 B1 *  6/2002 Tono et al. ................. 428/212

FOREIGN PATENT DOCUMENTS

| KR | 1998-66205 A | 10/1998 |
| KR | 2001-69165 A | 7/2001 |
| KR | 2001-246513 Y | 10/2001 |
| WO | WO 98/09816 A1 | 3/1998 |

* cited by examiner

*Primary Examiner*—Terrel Morris
*Assistant Examiner*—Andrew T Piziali
(74) *Attorney, Agent, or Firm*—Alston & Bird LLP (57) ABSTRACT

The present invention relates to a fire-resistant composite panel having superior fire-resistance and impact-resistance, a low dimensional change, and good workability to form a curvature, and it also relates to a fire-resistant decorative composite panel using the same. The composite panel comprises a substrate layer formed by impregnating or coating a substrate material of a woven or nonwoven fabric of inorganic fiber, or a paper, with a resin compound that contains an inorganic filler having less as a component and a thermosetting resin, and a rear layer of an aluminum sheet or a galvanized steel plate.

30 Claims, 6 Drawing Sheets

FIRE-RESISTANT COMPOSITE PANEL AND FIRE-RESISTANT DECORATIVE COMPOSITE PANEL USING THE SAME

BACKGROUND OF THE INVENTION (a) Field of the Invention

The present invention relates to a fire-resistant composite panel, and more particularly, to a fire-resistant composite panel that can be used in various applications such as for interior finishing materials for passenger cars, interior materials for ships and automobiles, materials for walls of subway stations, washrooms and kitchens, building interior or exterior materials for ceilings and floors, and for furniture, the fire-resistant composite panel having excellent fire-resistance and impact-resistance, a low dimensional change, and good workability to form a curvature. The present invention also relates to a fire-resistant decorative composite panel using the fire-resistant composite panel.

(b) Description of the Related Art

A common melamine-based decorative panel is generally formed by pressing a plurality of layers consisting of a surface protective layer and a decoration layer both impregnated by a melamine resin, and a core layer impregnated by a phenol resin onto kraft paper, using a multi-stage press at an elevated temperature under a high pressure. However, these decorative panels have drawbacks of being thermally weak due to their high content of resins and pulp layers.

Therefore, in order to meet the requirement of fire-resistance for materials used as building interior and exterior materials, furniture, and the like, ground stone or processed metals are used, and alternately, tiles made of ceramics or porcelain are attached to the surface. Though these materials have good durability and fire-resistance, they have drawbacks of a high manufacturing cost, a heavy weight, and low workability; and furthermore there is limitation for their use as colorful decoration.

Figure 2:
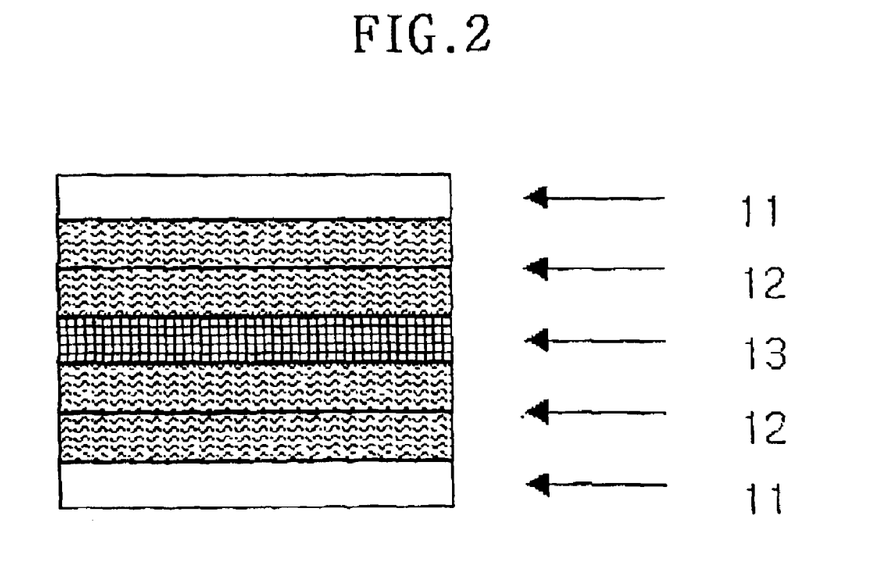
FIG. 2 is a sectional view of a conventional fire-resistant decorative panel.
Figure 3:
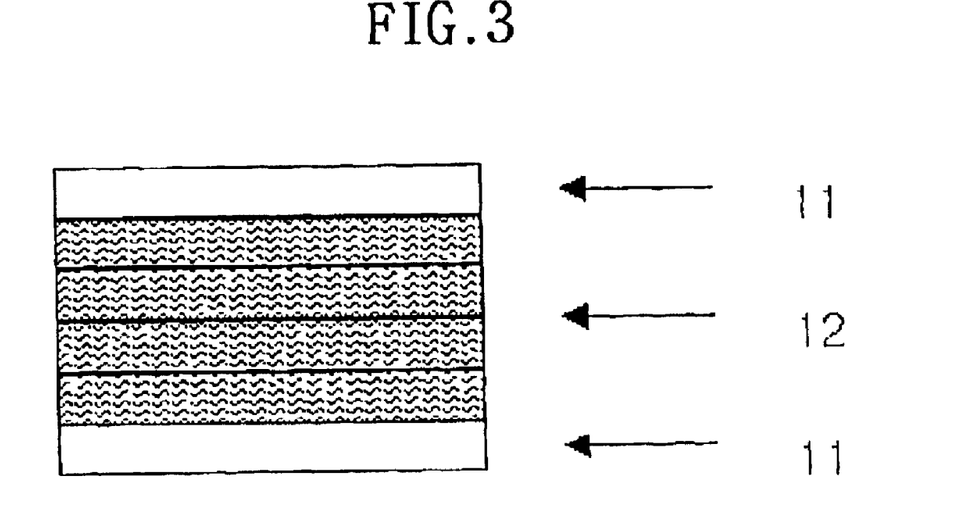
FIG. 3 is a sectional view of another conventional fire-resistant decorative panel.

In order to solve the above-mentioned problems, fire-resistant melamine-based decorative materials comprising a specific inorganic compound in their substrate layer have been proposed, examples of which can be found in Japanese Patent Pub. Nos. 03-253342 (FIG. 1), 11-268186 (FIG. 2), 10-305527 (FIGS. 2 and 3), 10-305525 (FIGS. 2 and 3), etc. These decorative panels have a multi-layered configuration consisting of, from top to bottom, a sheet for a decorative layer using a patterned substrate and a melamine resin, a basic material layer made by blending an inorganic filler such as a nonwoven glass fabric and aluminum hydroxide with a melamine resin or a phenol resin and by impregnating or coating, a reinforcing layer made by blending and impregnating a nonwoven glass fabric with a melamine resin or a phenol resin, another basic material layer and another decorative layer. These layers are molded with a multi-stage press at a high temperature under a high pressure.

However, although such conventional fire-resistant melamine-based decorative panels exhibit improved fire-resistance compared with common melamine-based decorative panels, there are still problems in that their fire-resistance and dimensional stability are insufficient because a large amount of resin is used in order to improve strength and processability of the decorative panels and their manufacturing cost is increased due to the use of inorganic filler such as aluminum hydroxide.

Moreover, the conventional fire-resistant melamine-based decorative panel does not have enough impact resistance to be used alone when its thickness is not more than 2 mm, and it can not be used to construct a curved surface.

SUMMARY OF THE INVENTION

Taking into consideration of the problems of the prior arts, an object of the present invention is to provide a fire-resistant composite panel having excellent fire-resistance, impact-resistance and dimensional stability; and also to provide a fire-resistant decorative composite panel using the same.

Another object of the present invention is to provide a fire-resistant composite panel comprising a rear layer that imparts superior flexibility to the panel itself thereby enabling working it to a curved shape, and to provide a fire-resistant decorative composite panel using the same.

Yet another object of the present invention is to provide a fire-resistant composite panel comprising an inorganic filler that imparts superior strength to the decorative panel, and to provide a fire-resistant decorative composite panel using the same.

In order to achieve these objects and others, the present invention provides a fire-resistant composite panel comprising:

a) a substrate layer formed by impregnating or coating a substrate material of a woven or nonwoven fabric of inorganic fiber, or a paper, with a resin compound which contains an inorganic filler having loess as a main component and a thermosetting resin selected from the group consisting of a phenol resin a modified phenol resin, a modified phenol-urea resin, a melamine resin, and a modified melamine resin; and b) a rear layer of an aluminum sheet or a galvanized steel plate.

Further, the present invention provides a fire-resistant decorative composite panel comprising:

a) a decoration layer formed by impregnating or coating a thermosetting resin onto a patterned substrate;

b) a substrate layer formed by impregnating or coating a substrate material of a woven or nonwoven fabric of inorganic fiber, or a paper, with a resin compound which contains an inorganic filler having loess as a main component and a thermosetting resin selected from the group consisting of a phenol resin, a modified phenol resin, a modified phenol-urea resin, a melamine resin, and a modified melamine resin; and c) a rear layer of an aluminum sheet or a galvanized steel plate.

DETAILED DESCRIPTION OF THE PREFERRED EMBODIMENTS

The present invention will be explained more specifically in the following.

The present invention provides an integrated fire-resistant composite panel formed by superposing an aluminum sheet or a galvanized steel plate on the rear surface of a substrate material and then molding them at a high temperature under a high pressure, wherein the substrate material is made by stacking one or more sheets impregnated or coated on a substrate of woven or nonwoven fabric made from an inorganic fiber such as glass fiber or alumina fiber, or a paper, with the resin compound including an inorganic filler having loess as a main component, and a phenol resin, a modified phenol resin, a modified phenol-urea resin, a melamine resin, or a modified melamine resin, containing a good fire retardant.

The fire-resistant composite panel according to the invention has superior fire-resistance, impact-resistance and dimensional stability; and good workability of its rear layer enables the panel to be formed in a curve.

The present invention also provides a fire-resistant decorative composite panel having a decorated surface by integrating a patterned sheet that is impregnated with a thermosetting resin such as a melamine resin on the surface of the above-mentioned fire-resistant composite panel that is used as a substrate layer.

Further, a fire-resistant composite panel and a fire-resistant decorative composite panel according to the present invention may have a reinforcing layer interposed between the substrate layer and the decoration layer, between each of the substrate layers, or between the substrate layer and the rear layer, the reinforcing layer being formed by impregnating or coating a woven inorganic fiber such as glass fiber or alumina fiber, or kraft paper with a resin compound of a thermosetting resin such as fire-resistant modified melamine resin or modified phenol resin.

The substrate layer and the reinforcing layer may be used in multiple layers, the configuration of which can be varied according to the application and thickness thereof. Particularly, if they are used as a wall body, they are preferably prepared to have a thickness of 2 to 5 mm, and in this case the number of substrate layers may be 1 to 5 sheets and the number of reinforcing layers may be 1 to 12 sheets depending on the necessity. The thickness of the rear layer is preferred to be in the range of 0.2 to 2 mm in order to facilitate working into a curvature.

When the fire-resistant composite panel is formed into a fire-resistant decorative composite panel, it may be subject to various methods of decoration. The decoration methods include, as typical examples, coating the surface of the fire-resistant composite panel with paint and the like, and impregnating or coating the decoration layer with a thermosetting resin and the like as described above and then attachin the treated layer to the surface of the fire-resistant panel. The decorative composite panel may be specifically named a melamine decorative composite panel, a phenol decorative composite panel, an acryl-based decorative composite panel, or a urethane-based decorative composite panel in accordance with the kind of resin contained in the finish coat applied or the kind of thermosetting resin impregnated in the decoration layer such as melamine resin, phenol resin, acryl resin, or urethane resin.

A decorative composite panel more suitable for use of a fire-resistant composite panel of the present invention is a panel which has a fire-resistant property imparted to its surface and, considering that the fire-resistant composite panel is a thermosetting resin, the panel is made by superposing a decoration layer impregnated or coated with a thermosetting resin and the like on the surface of a patterned paper, and then heat-pressing to effect attachment.

The types of decorative composite panels according to the invention are described in the following.

As a first type, a fire-resistant decorative composite panel using loess comprises, from top to bottom (FIG. 5):
  i) a decoration layer;
  ii) 1 to 5 substrate layers; and
  iii) a rear layer.

As a second type, a fire-resistant decorative composite panel using loess comprises, from top to bottom (FIG. 6):
  i) a decoration layer;
  ii) 1 to 5 substrate layers;
  iii) 1 to 12 reinforcing layers; and
  iv) a rear layer.

As a third type, a fire-resistant decorative composite panel using loess comprises, from top to bottom (FIG. 7):
  i) a decoration layer;
  ii) 1 to 12 reinforcing layers;
  iii) 1 to 5 substrate layers; and
  iv) a rear layer.

As a fourth type, a fire-resistant decorative composite panel using loess comprises, from top to bottom (FIG. 8):
  i) a decoration layer;
  ii) 1 to 5 substrate layers;
  iii) 1 to 12 reinforcing layers;
  iv) 1 to 5 substrate layers; and
  v) a rear layer.

As a fifth type, a fire-resistant decorative composite panel using loess comprises, from top to bottom (FIG. 9):
  i) a decoration layer;
  ii) 1 to 12 reinforcing layers;
  ii) 1 to 5 substrate layers;
  iv) 1 to 12 reinforcing layers; and
  v) a rear layer.

A fire-resistant composite panel according to the present invention also has a configuration of the afore-mentioned five types of fire-resistant decorative composite panels such that a decoration layer as the top layer is not included, but a substrate layer is intended to be the top layer. Such a fire-resistant composite panel is fabricated without decorating, and the decoration may be performed by a separate process or by a separate paint coating and the like at the installation site.

In the following, the above layers are explained, respectively.

The substrate layer is a sheet shaped layer formed by impregnating or coating a substrate material of a woven or nonwoven fabric of inorganic fiber, or a paper, with a resin compound which contains an inorganic filler having loess as a main component and a phenol resin, a modified phenol resin, a modified phenol-urea resin, a melamine resin, or a modified melamine resin.

The substrate material for the substrate layer is preferably a woven or nonwoven fabric of inorganic fibers such as glass fiber or alumina fiber, or a paper such as kraft paper. Particularly, a preferred substrate material is a nonwoven fabric of glass fiber that is made by chopping a glass fiber having a composition of E-glass with a fiber diameter of 6 to 30 μm into a length of 10 to 50 mm using a needling machine, and then by blending a binder such as an epoxy resin, an acryl resin, or a polyvinyl alcohol resin therein.

The substrate material preferably has weight per unit area of 30 to 200 g/m². When the weight per unit area is less than 30 g/m², problems may be caused during impregnating, coating, forming or handling due to insufficient strength of the decorative panel made. On the other hand, when the weight per unit area exceeds 200 g/m², the panel becomes hard and efficiency of impregnation or coating as well as workability is lowered.

It is preferred that the resin compound of modified melamine resin or modified phenol resin impregnated into the substrate material for the substrate layer comprises:
i) 3.0% to 10.0% by weight (based on solid mass) of a first condensate of melamine or phenol resin;
ii) 50% to 80% by weight of loess;
iii) 1.0% to 5.0% by weight of fire retardant; and
iv) 10% to 40% by weight of solvent(water or alcohol).

Specifically, when the compound contains not more than 5% by weight of the modified melamine resin or modified phenol resin and more than 4.0% by weight of the fire retardant, it can be classified as Grade 1 for a fire-resistance test according to Korean Standard No. KS F 2271 entitled "Testing method for incombustibility of internal finish materials and elements of building."

In the resin compound, a part of the loess to be used as an inorganic filler may be replaced by an alternative inorganic filler selected from the group consisting of aluminum hydroxide, magnesium hydroxide and talc, in order to improve workability after the process of press-forming.

In such a case, the composition of the resin compound preferably comprises:
i) 3.0% to 10.0% by weight (based on solid mass) of a first condensate of melamine or phenol resin;
ii) 40% to 70% by weight of loess;
iii) 3% to 20% by weight of an alternative inorganic filler selected from the group consisting of aluminum hydroxide, magnesium hydroxide and talc;
iv) 1.0% to 5.0% by weight of fire retardant; and
v) 10% to 40% by weight of solvent (water or alcohol).

The resin compound may be used as it is or with the addition of a diluent such as water or alcohol. The amount of the resin compound to be impregnated (or coated) is preferably 400 to 2000 parts by weight based on 100 parts by weight of the substrate material. If the impregnated amount is less than 400 parts by weight, more sheets are required to adjust the specified thickness and the cost will be increased, whereas if the amount exceeds 2000 parts by weight, drying time is extended to thereby lower the productivity, and inter-layer adhesive strength after press-forming may also become weak.

The modified melamine resin and modified phenol resin are liquid-phase resins, and they are the first condensates prepared by a usual polymerization process using 25% to 45% by weight of melamine or phenol, 30% to 60% by weight of formaldehyde, 2% to 5% by weight of a plasticizer and 10% to 25% by weight of distilled water as a solvent. In the case of using the melamine resin, a curing agent may be further added in order to reduce the time required for curing.

As the fire retardant, a liquid phase fire retardant containing phosphor and nitrogen and a solid phase fire retardant, dicyandiamide, may be used in combination. The charging method is preferably carried out by adding 100 parts by weight of the first condensate, 15 to 30 parts by weight of fire retardant containing phosphor/nitrogen, and 5 to 10 parts by weight of dicyandiamide as a solid phase fire retardant. By means of addition of these fire retardants, the resin will acquire fire-resistant properties.

A preferable example of the liquid phase fire retardant containing phosphor and nitrogen is Melflam 131 A (product of SKW Trostberg, Germany), which is an aqueous solution containing nitrogen and phosphor and which contains 35% to 45% by weight of active components. A function of this fire retardant is to produce polymerized polyphosphoric acid by promoting thermal polycondensation of polyphosphoric acid if the decorative panel is subjected to a high temperature when a fire breaks out, and the thus-produced polymeric polyphosphoric acid will then act as a dehydrogenation catalyst to form charcoal, and thereby oxygen and heat will be interrupted and superior nonflammable effects are thence exhibited. Further, many kinds of nitrogen components contained in the melamine resin also assist in the production of polymeric polyphosphoric acid. When such a liquid phase fire retardant containing phosphor and nitrogen is used together with dicyandiamide as a solid phase fire retardant, the effect will be doubled by virtue of fire-resistant synergism.

Dicyandiamide is a solid and it reacts with various materials contained in the resin compound such as formaldehyde, water, and ammonium salt to change them into a nonflammable substance, thereby resulting in fire-resistant effects that exclude the ability of the decorative panel to burn if it is subjected to a high temperature when a fire breaks out. Particularly, when it is used together with a liquid phase fire retardant containing phosphor and nitrogen, the effect will be doubled by virtue of fire-resistant synergism as previously noted.

Loess as an inorganic filler does not transfer heat if the decorative panel is subjected to a high temperature when a fire breaks out, and additionally the water of crystallization contained within the loess component absorbs heat to provide a fire-resistant effect. Furthermore, loess effects a uniform heat transfer to the resin during the formation of the decorative panel under a condition of high temperature and high pressure, and it provides good adhesion between each layer.

In general, loess is known to have pharmaceutical efficacy such as detoxifying potential or antibacterial effects, and it is widely used as a purifying agent against environmental pollutants, for cosmetic materials and as therapeutics for folk remedies. As loess has a capability of infrared irradiation in addition to its conventional uses, it can provide a warming effect to the human body as well as thermal insulation to buildings when it is included within the composite panel according to the present invention.

Loess used in the present invention exhibits different colors such as white, yellow or red depending on the district of its origin, and it is found in Korea at Sancheong in Gyeongsangnam-do, Chongdo in Gyeongsangbuk-do, Gurye or Hwasun in Jeollanam-do and Buan in Jeollabuk-do is particularly preferred. Preferably, the loess has a composition of 10% to 90% by weight of silicon dioxide, 10% to 80% by weight of aluminum oxide, 0.1% to 50% by weight of iron oxide, 0.1% to 30% by weight of magnesium oxide, 0.1% to 50% by weight of calcium oxide, 0.1% to 30% by weight of potassium oxide, 0.1% to 5% by weight of mineral oxide and inorganic material, 0% to 5% by weight of moisture and 0.1% to 20% by weight of impurities as a remainder.

Loess used in the present invention may be natural loess itself or a calcined loess which has been treated by calcining at a temperature of 300° to 1000° C. Such calcined loess is obtained by eliminating organic compounds contained therein and then by reducing irregularly scattered micropores as well as water of crystallization to a certain level. Such calcined loess can be used in further increased quantities because it has a reduced amount of oil absorption during blending with resin, thus providing better fire-resistant properties.

The particle size distribution of loess used as an inorganic filler in the present invention is preferably 5 to 300 $\mu$m, while its mean particle size is preferably 10 to 50 $\mu$m. If loess with particle size below the above range is used, the viscosity of the resin will become high due to strong oil absorptivity of resin and solvent so that efficiency of impregnation or coating workability is lowered. On the other hand, if loess with a particle size of over the above range is used, smoothness of the panel surface may be reduced by the presence of large particles on the surface during the formation of the decorative panel under a condition of high temperature and high pressure after impregnation or coating.

The particle size of the alternative inorganic filler such as aluminum hydroxide, magnesium hydroxide or talc which is used to replace a part of the loess is preferably in the range of 10 to 50 $\mu$m. If an inorganic filler with a particle size below the above range is used, the resin viscosity will become high due to strong oil absorptivity of resin and solvent so that workability is lowered. On the other hand, if an inorganic filler with a particle size of over the above range is used, smoothness of panel surface may be reduced by the presence of large particles on the surface after the product is formed.

The composite panel and the decorative composite panel according to the present invention can be made to have a reinforcing layer interposed between the substrate layer and the decoration layer, between each substrate layers, or between the substrate layer and the rear layer, wherein the reinforcing layer is formed by impregnating or coating a woven or nonwoven fabric of inorganic fiber such as glass fiber and alumina fiber, or kraft paper with modified melamine resin or modified phenol resin.

In the case the substrate material of the reinforcing layer is woven fabric, its weight per unit area is preferably in the range of 30 to 150 g/m$^2$. If the weight per unit area is less than 30 g/m$^2$, the thickness of the fiber will not be sufficient such that it will be too pliable and its handling and workability during lamination will be poor. On the other hand, if the weight per unit area is more than 150 g/m$^2$, the fiber will become too thick such that marks of the fibers may be transcribed to the surface of the panel upon production, and the adhesive strength will become too weak such that separation of the layers may occur. The woven fabric of inorganic fiber used as a substrate material for the reinforcing layer is preferably a woven fabric of glass fiber having an E-glass composition, made by means of a weaving machine.

In the case the substrate material of the reinforcing layer is kraft paper, its weight per unit area is preferably 70 to 300 g/m$^2$. If the weight per unit area is less than 70 g/m$^2$, workability such as impregnation and lamination will become worse, and on the other hand, if the weight per unit area is more than 300 g/m$^2$, it will be difficult to adjust thickness required in the panel production and the adhesive strength between upper and lower layers will become too weak such that separation of the layers may occur.

The reinforcing layer is prepared by impregnating (or coating) 100 parts by weight of a woven fabric of inorganic fiber or kraft paper with 40 to 200 parts by weight of the compound of modified melamine resin or modified phenol resin which is used in the substrate layer. Alternatively, impregnation can be carried out with 40 to 100 parts by weight of modified melamine resin alone or modified phenol resin alone, both containing no inorganic loess filler. However, the greater the amount of resin used, the worse the fire-resistance will be.

The decoration layer used in the decorative composite panel according to the present invention has a sheet shape, and it comprises a thermosetting resin sheet made by impregnating or coating 100 parts by weight of a paper substrate having a weight per unit area of 40 to 200 gm$^2$. The substrate is made of synthetic pulp, wood, textile fabrics, organic synthetic fiber and the like with 50 to 200 parts by weight of a resin such as melamine resin, phenol resin, acryl resin and urethane resin. When an inorganic component such as titanium oxide is blended in the substrate material of the decoration layer, fire-resistance may be enhanced, and using a lesser amount of resin is advantageous for fire-resistance.

The rear layer used in the present invention is an aluminum sheet or a galvanized steel plate, which has superior strength, corrosion resistance and workability so that tie panel is suitable for use as an internal finish material for passenger cars, ships, automobiles and the like. In particular, the preferred alloy material of the aluminum sheet is A1050, A3004 or A5052, but it is not limited to them. It is desirable that the aluminum sheet or galvanized steel plate is coated with various kinds of thermosetting resins on its surface in order to facilitate an integrated formation thereof with the substrate material by heat-pressing.

Figure 10:
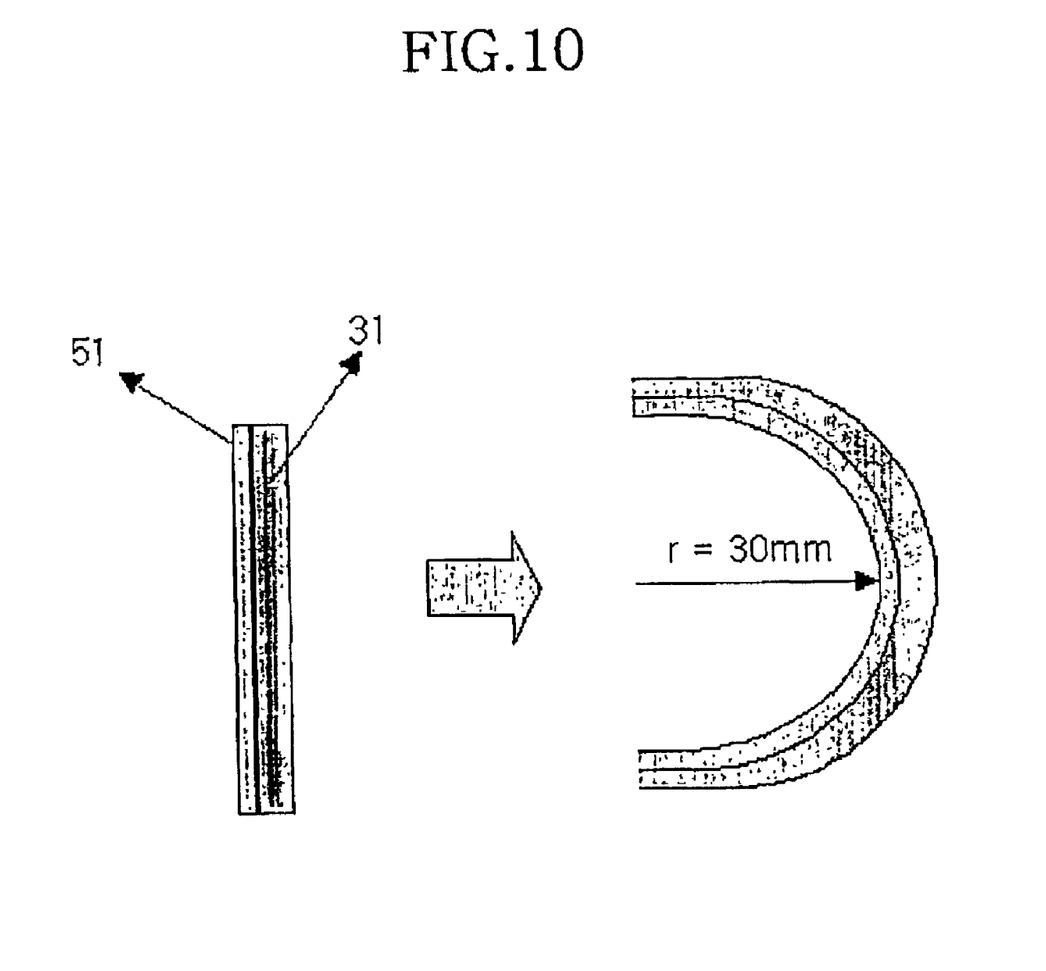
FIG. 10 is an explanatory diagram of fabricating a fire-resistant composite panel according to the present invention into a curved surface.

The rear layer described above enables the composite panel and the decorative composite panel to be worked into a curvature, and it imparts a high impact-resistance upon them. The radius of curvature that indicates a degree of curvature-forming is different according to the thickness of the rear layer(31). In the case the thickness of the rear layer is 0.5 to 2 mm, when it is positioned at the rear side of an upper layer(51) (example of the type with: substrate layer, decoration layer/substrate layer, decoration layer/reinforcing layer/substrate layer, decoration layer/substrate layer/reinforcing layer/substrate layer, etc.) having a thickness of 0.4 to 1.0 mm and these layers are integrally formed by means of heat-press, a curvature working up to a radius of curvature of 30 mm is possible, as shown in FIG. 10. When curvature working is done without such a rear layer or the material is bent simply by force, it will be broken because of insufficient drag force of the substrate layer or the decoration layer.

The fire-resistant composite panel and fire-resistant decorative composite panel according to the present invention are produced by preparing individual layers, then superposing these layers and heat-pressing them with a multistage press. In this process, it is preferable to use a plurality of sheets for the substrate and reinforcing layers in consideration of panel thickness, with a single sheet of the decoration layer being used for each surface. In addition, if a mirror plate, embossed plate, or the like is superposed on the product surface when forming is done by heat-pressing, an embossing effect may be provided.

The fire-resistant composite panel and fire-resistant decorative composite panel according to the present invention have at least three times higher impact-resistance as well as equivalently good dimensional stability when compared with a conventionally-made melamine-based fire-resistant panel having a thickness of 2.0 to 4.5 mm. Therefore, the decorative composite panel itself can be attached on a wall or a frame of steel or wood, or the like, by means of adhesives, screws, nails, etc. without using any separate reinforcing plate material. The fire-resistant decorative composite panel according to the present invention is designed for attachment in such a manner that the decoration layer is oriented to face outward in order to enable the decorative surface to be seen from outside.

The fire-resistant composite panel and the fire-resistant decorative composite panel have excellent fire-resistance and impact-resistance, and they exhibit a low dimensional change, so they can be suitably used in various applications such as for internal finish materials for passenger cars, interior materials for ships and automobiles, materials for walls of subway stations, washrooms and kitchens, building interior or exterior materials for ceilings and floors, for the floor of passenger cars, and furniture, and as they can be worked to form a curvature, their application field is quite broad.

The present invention will be described in further detail with reference to the following examples and comparative examples. However, the examples are intended to be illustrative of the present invention, and the present invention is not to be limited to them.

EXAMPLES

Example 1

(Preparation of a Compound of a Fire-resistant Melamine Resin and Loess for a Substrate Layer and a Fire-resistant Kraft Layer)

1.7 mol of formaldehyde was added to 1 mol of melamine and the mixture was reacted at 95° C. under a weak alkaline condition, and then the content of the reagents was controlled by adding a plasticizer and water to obtain an initial condensation product. 0.1 parts by weight of paratoluenesulfonic acid (PTSA) as a hardener and 0.1 parts by weight of Melpers RH4 (product of SKW Trostberg, Germany) as a potential hardener (a hardener which promotes reaction exclusively at a high temperature) were added to 100 parts by weight of this initial condensation product to obtain a melamine resin. 20 parts by weight of Melflam 131A as a liquid fire retardant and 4.0 parts by weight of dicyandiamide as a solid fire retardant were added to 100 parts by weight of the melamine resin to obtain a fire-resistant melamine resin.

900 parts by weight of loess having an average particle size of 10 to 50 μm were added to 100 parts by weight of the above-obtained fire-resistant melamine resin to prepare a resin compound of fire-resistant melamine resin and loess.

(Preparation of a Substrate Layer Sheet)

Nonwoven fabric of E-glass fiber with a weight per unit area of 110 g/m² obtained by treatment of the above resin compound of fire-resistant melamine resin and loess with acryl resin-based binder was impregnated and it was dried to prepare a substrate layer sheet having a degree of impregnation of 800% by weight based on dry weight.

(Preparation of a Melamine Resin for Decoration Layer)

1.7 mol of formaldehyde was added to 1 mol of melamine and the mixture was reacted at 95° C. under a weak alkaline condition, and then the content of the reagents was controlled by adding water to obtain an initial condensation product. 0.2 parts by weight of paratoluenesulfonic acid (PTSA) as a hardener and 0.2 parts by weight of Melpers RH4 (product of SKW Trostberg, Germany) as a potential hardener (a hardener which promotes reaction exclusively at a high temperature) were added to 100 parts by weight of this initial condensation product to prepare a melamine resin.

(Preparation of a Decoration Layer Sheet)

The above-obtained melamine resin was impregnated to 90% by weight into printed patterned paper of 80 g/m² into which titanic oxide was incorporated, and a decoration layer sheet was obtained.

(Preparation of a Rear Layer Sheet)

A melamine-based thermosetting resin binder was uniformly coated to a thickness of 0.05 to 0.2 mm on the surface of a 0.8 mm thick aluminum sheet, and then the coated sheet was completely dried under a natural environment to prepare a rear layer.

Figure 5:
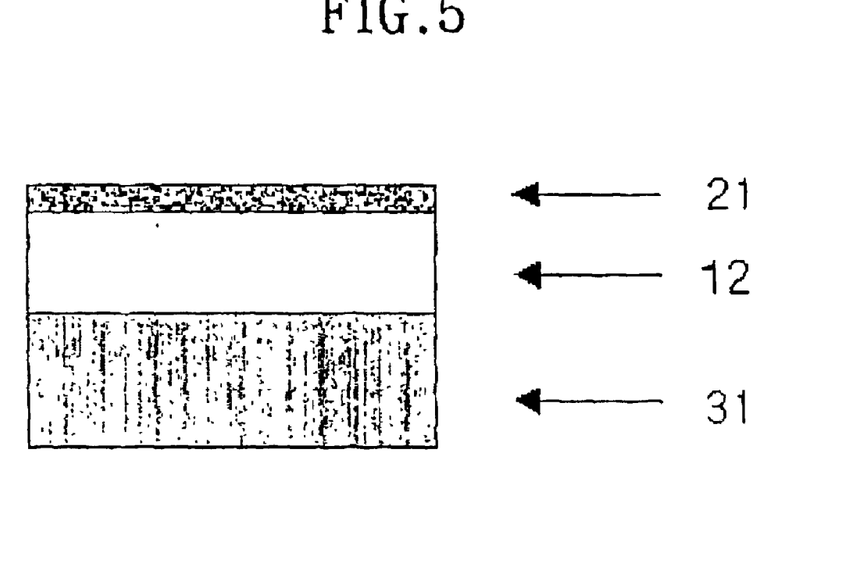
FIG. 5 is a sectional view of a fire-resistant decorative composite panel according to Example 1.

(Preparation of a Fire-resistant Decorative Composite Panel: FIG. 5)

The above-obtained sheets were stacked from top to bottom in the order of 1 sheet of the decoration layer, 1 sheet of the substrate layer sheet, and 1 sheet of the rear layer, and then a mirror plate of stainless steel was superposed on the decoration layer. It was all subjected to heat-pressing at a temperture of 150° C. and a pressure of 100 kgf/cm² for 30 minutes, and thus a fire-resistant melamine-based decorative aluminum composite panel having a thickness of 1.5 mm was prepared.

Example 2

(Preparation of a Compound of a Fire-resistant Phenol Resin and Loess for a Substrate Layer and a Reinforcing Layer)

1.4 mol of formaldehyde was added to 1 mol of phenol and the mixture was reacted at 100° C. under a weak alkaline condition, and then the content of the reagents was controlled by adding water to obtain an initial condensation product. 20 parts by weight of Melflam 131A as a liquid fire retardant and 4.0 parts by weight of dicyandiamide as a solid fire retardant were added to 100 parts by weight of this initial condensation product to obtain a fire-resistant phenol resin.

900 parts by weight of loess having an average particle size of 10 to 50 μm was added to 100 parts by weight of the above-obtained fire-resistant phenol resin to prepare a resin compound of fire-resistant phenol resin and loess.

(Preparation of a Substrate Layer Sheet)

Nonwoven fabric of E-glass fiber with a weight per unit area of 110 g/m² obtained by treatment with acryl resin-based binder was impregnated with the above resin compound of fire-resistant phenol resin and loess, and it was dried to prepare a substrate layer sheet having a degree of impregnation of 800% by weight based on dry weight.

(Preparation of a Decoration Layer Sheet)

A decoration layer sheet as in Example 1 was prepared.

(Preparation of a Reinforcing Layer Sheet)

Nonwoven fabric of E-glass fiber with a weight per unit area of 60 g/m² was impregnated with the above resin compound of fire-resistant phenol resin and loess, and it was dried to prepare a reinforcing layer sheet of 300% by weight based on dry weight.

(Preparation of a Rear Layer Sheet)

A phenol-based thermosetting resin binder was uniformly coated to a thickness of 0.05 to 0.2 mm on the surface of a 0.4 mm thick galvanized metal plate, and then the coated plate was completely dried under a natural environment to prepare a rear layer.

Figure 6:
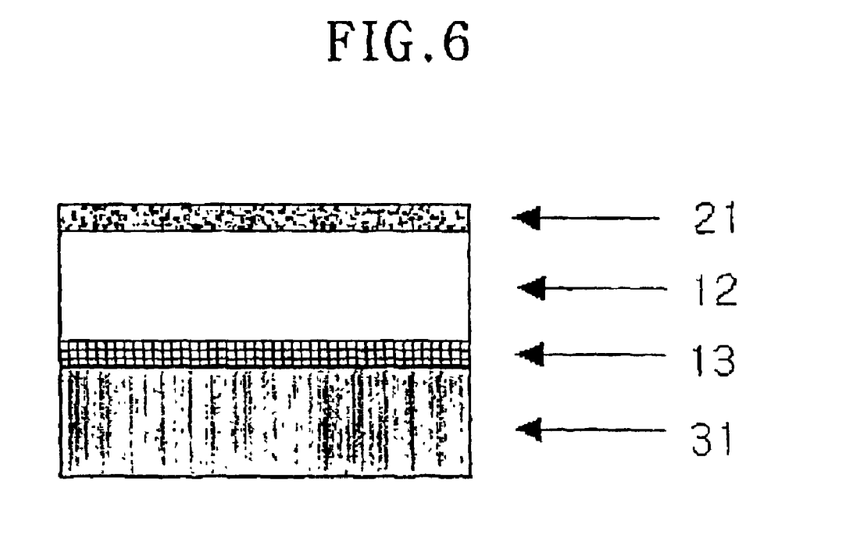
FIG. 6 is a sectional view of a fire-resistant decorative composite panel according to Example 2.

(Preparation of a Fire-resistant Decorative Composite Panel: FIG. 6)

The above-obtained sheets were stacked from top to bottom in the order of 1 sheet of the decoration layer, 1 sheet of the substrate layer, 1 sheet of the reinforcing layer, and 1 sheet of the rear layer, and then a mirror plate of stainless steel was superposed on the decoration layer. It was all subjected to heat-pressing at a temperature of 150° C. and a pressure of 100 kgf/cm² for 30 minutes, and thus a fire-resistant melamine-based decorative galvanized steel composite panel having a thickness of 1.5 mm was prepared.

Example 3

(Preparation of a Substrate Layer Sheet)

A substrate layer sheet as in Example 2 was prepared.

(Preparation of a Sheet of Reinforcing Layer and Fire-resistant Kraft Layer)

A fire-resistant kraft paper was impregnated to a weight per unit area of 300 g/m² with the fire-resistant phenol resin prepared in Example 2 and dried to prepare a fire-resistant kraft layer sheet of 80% by weight based on dry weight.

(Preparation of a Decoration Layer Sheet)

The fire-resistant phenol resin prepared in Example 2 was impregnated to 90% by weight into printed patterned paper of 80 g/m² into which titanic oxide was incorporated, and a decoration layer sheet was obtained.

(Preparation of a Rear Layer Sheet)

A phenol-based thermosetting resin binder was uniformly coated to a thickness of 0.05 to 0.2 mm on the surface of a 0.4 mm thick aluminum sheet, and then the coated sheet was completely dried under a natural environment to prepare a rear layer.

Figure 7:
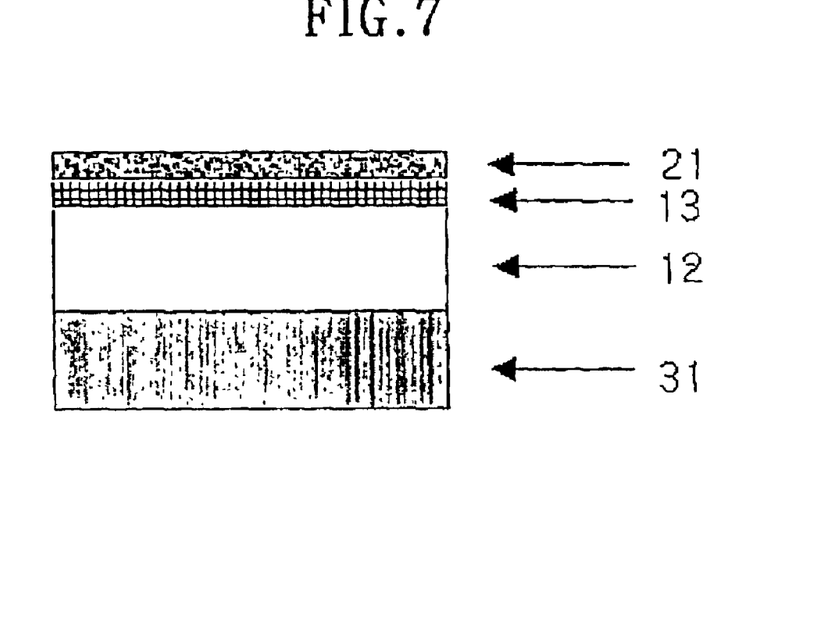
FIG. 7 is a sectional view of a fire-resistant decorative composite panel according to Example 3.

(Preparation of a Fire-resistant Decorative Composite Panel: FIG. 7)

The above-obtained sheets were stacked from top to bottom in the order of 1 sheet of the decoration layer, 1 sheet of the reinforcing layer, 1 sheet of the substrate layer sheet, and 1 sheet of the rear layer, and then a mirror plate of stainless steel was superposed on the decoration layer. It was all subjected to heat-pressing at a temperature of 150° C. and a pressure of 100 kgf/cm² for 30 minutes, and thus a fire-resistant phenol-based decorative aluminum composite panel having a thickness of 1.5 mm was prepared.

Example 4

(Preparation of a Substrate Layer Sheet)

A substrate layer sheet as in Example 1 was prepared.

(Preparation of a Reinforcing Layer Sheet and a Fire-resistant Kraft Layer)

A fire-resistant kraft paper was impregnated to a weight per unit area of 300 g/m² with the fire-resistant phenol resin prepared in Example 2 and dried to prepare a fire-resistant kraft layer sheet of 80% by weight based on dry weight.

(Preparation of a Decoration Layer Sheet)

A decoration layer sheet as in Example 1 was prepared.

(Preparation of a Rear Layer Sheet)

A rear layer sheet as in Example 1 was prepared.

Figure 8:
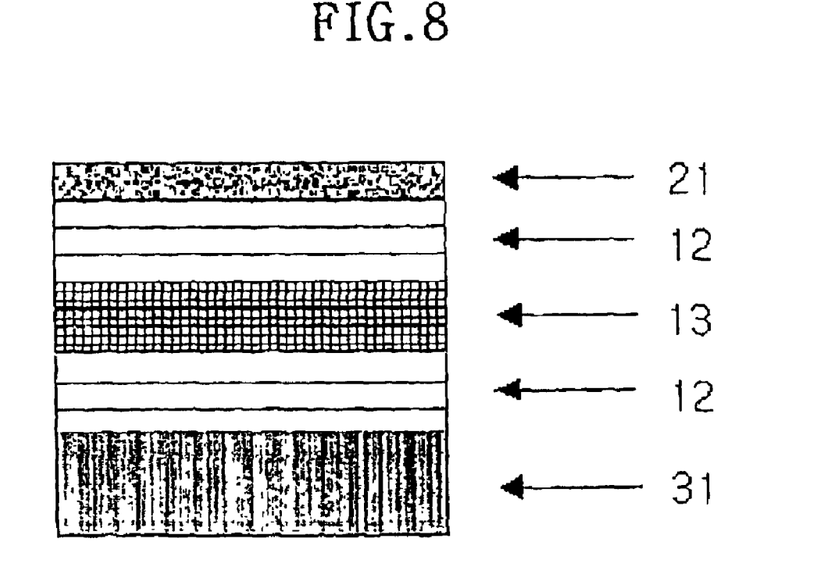
FIG. 8 is a sectional view of a fire-resistant decorative composite panel according to Example 4.

(Preparation of a Fire-resistant Decorative Composite Panel: FIG. 8)

The above-obtained sheets were stacked from top to bottom in the order of 1 sheet of the decoration layer, 3 sheets of the substrate layer sheet, 3 sheets of the fire-resistant kraft layer sheet, 3 sheets of the substrate layer sheet and 1 sheet of the rear layer, and then a mirror plate of stainless steel was superposed on each surface. The stacked sheets were then subjected to heat-pressing at a temperature of 150° C. and a pressure of 100 kgf/cm² for 30 minutes, and thus a fire-resistant melamine-based decorative aluminum composite panel having a thickness of 4.5 mm was prepared.

Example 5

(Preparation of a Substrate Layer Sheet)

A substrate layer sheet as in Example 1 was prepared.

(Preparation of a Sheet of Reinforcing Layer and Fire-resistant Kraft Layer)

A fire-resistant kraft paper was impregnated to a weight per unit area of 300 g/m² with the fire-resistant phenol resin prepared in Example 2 and dried to prepare a fire-resistant kraft layer sheet of 80% by weight based on dry weight.

(Preparation of a Decoration Layer Sheet)

A decoration layer sheet as in Example 1 was prepared.

(Preparation of a Rear Layer Sheet)

A rear layer sheet as in Example 1 was prepared.

Figure 9:
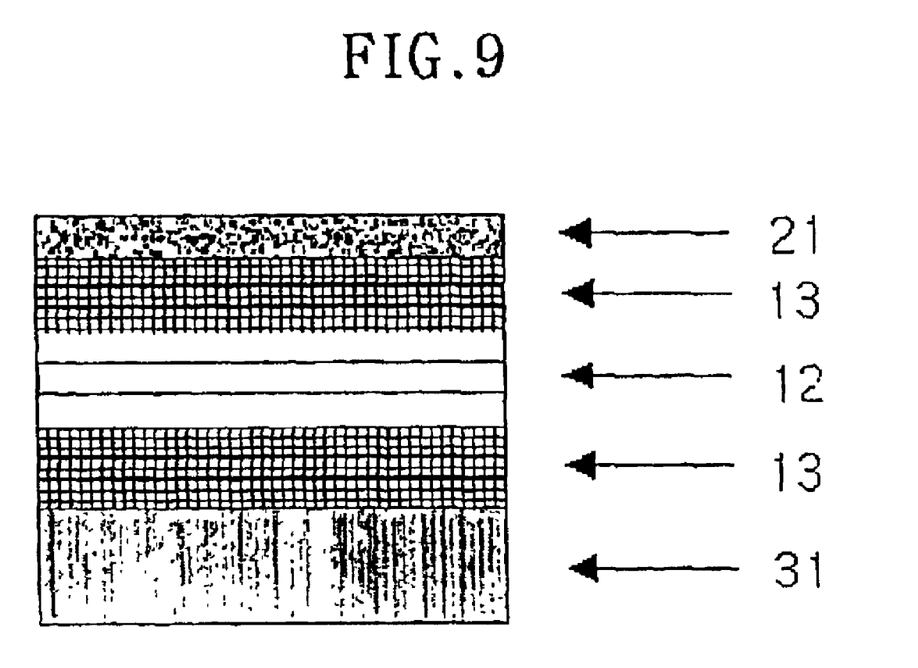
FIG. 9 is a sectional view of a fire-resistant decorative composite panel according to Example 5.

(Preparation of a Fire-resistant Decorative Composite Panel: FIG. 9)

The above-obtained sheets were stacked from top to bottom in the order of 1 sheet of the decoration layer, 3 sheets of the fire-resistant kraft layer sheet, 3 sheets of the substrate layer sheet, 3 sheets of the fire-resistant kraft layer sheet, and 1 sheet of the rear layer, and then a mirror plate of stainless steel was superposed on each surface. The stacked sheets were then subjected to heat-pressing at a temperature of 150° C. and a pressure of 100 kgf/cm² for 30 minutes, and thus a fire-resistant melamine-based decorative aluminum composite panel having a thickness of 4.5 mm was prepared.

Comparative Example 1

(Preparation of a Substrate Layer Sheet)

A substrate layer sheet was prepared in the same manner as in Example 1 except that aluminum hydroxide having a particle size of 10 to 50 μm was used instead of loess as an inorganic filler.

(Preparation of a Decoration Layer Sheet)

A decoration layer sheet as in Example 1 was prepared.

Figure 1:
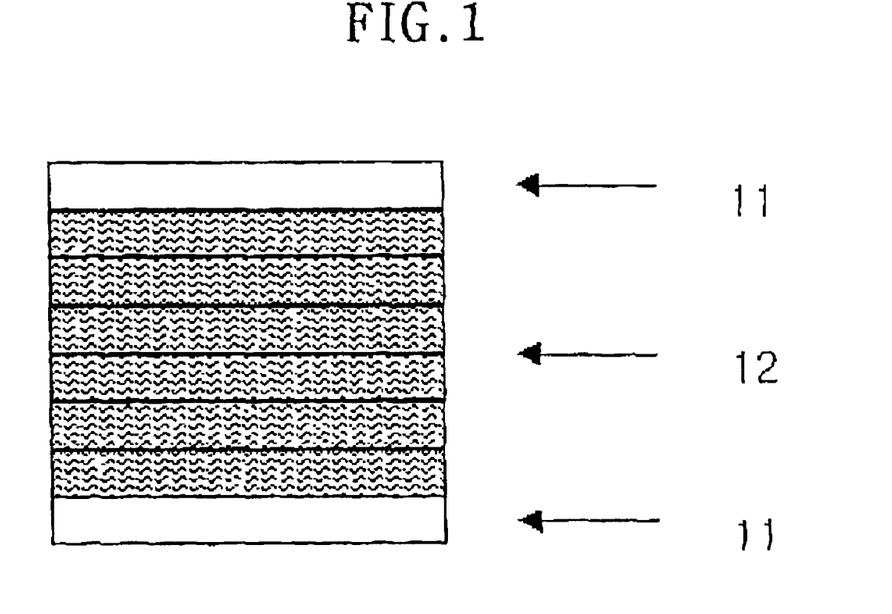
FIG. 1 is a sectional view of a conventional fire-resistant decorative material.

(Preparation of a Fire-resistant Melamine-based Decorative Panel: FIG. 1)

In the same manner as in Example 1, the above-obtained sheets were stacked from top to bottom in the order of 1 sheet of the decoration layer, 7 sheets of the substrate layer sheet and 1 sheet of the decoration layer, and then a mirror plate of stainless steel was superposed on each surface. The stacked sheets were then subjected to heat-pressing at a temperature of 150° C. and a pressure of 100 kgf/cm² for 30 minutes, and thus a fire-resistant melamine-based decorative panel having a thickness of 4.5 mm was prepared.

Comparative Example 2

(Preparation of a Decoration Layer and a Kraft Layer)

A decoration layer as in Example 1 and a melamine resin impregnated kraft layer for an ordinary melamine-based decorative plate were prepared as a substrate layer.

(Preparation of a Rear Layer Sheet)

A thermosetting resin binder was uniformly coated to a thickness of 0.05 to 0.2 mm on the surface of a 1.0 mm thick aluminum sheet, and then the coated sheet was completely dried under a natural environment to prepare a rear layer.

Figure 4:
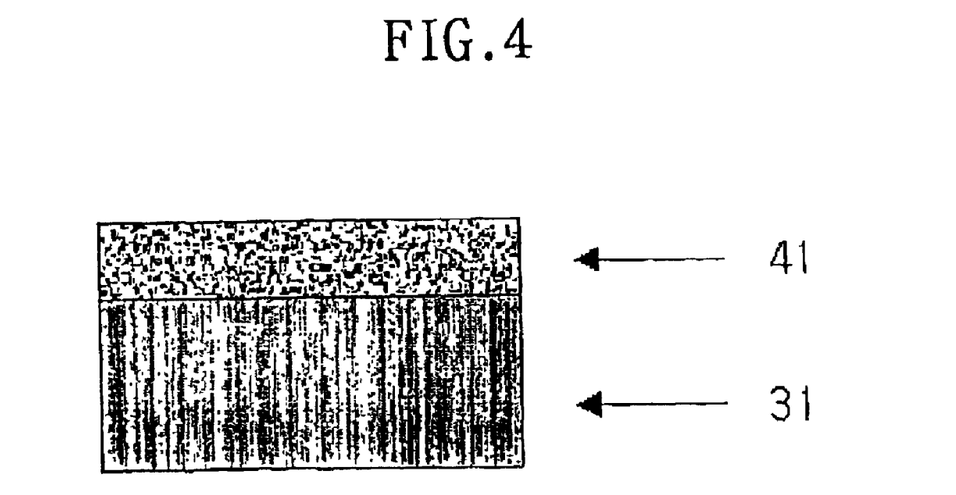
FIG. 4 is a sectional view of a general melamine-based decorative aluminum composite panel according to Comparative Example 2.

(Preparation of an Ordinary Melamine-based Decorative Aluminum Composite Panel: FIG. 4)

The above-obtained sheets were stacked from top to bottom in the order of 1 sheet of the decoration layer, 3 sheets of the phenol resin impregnated kraft sheet (substrate layer), and 1 sheet of the rear layer, and then a mirror plate of stainless steel was superposed on the surface of the decoration layer. The stacked sheets were then subjected to heat-pressing at a temperature of 150° C. and a pressure of 100 kgf/cm² for 30 minutes, and thus an ordinary melamine-based decorative aluminum composite panel having a thickness of 1.5 mm was prepared.

The physical properties of each of the fire-resistant decorative composite panels prepared in Examples 1 to 5 and Comparative Examples 1 and 2 were compared, and the results are summarized in the following Table 1.

TABLE 1

|  |  | Example 1 | Example 2 | Example 3 | Example 4 | Example 5 | Comp. Example 1 | Comp. Example 2 |
|---|---|---|---|---|---|---|---|---|
| Fire-resistance | Surface test | passed | passed | Passed | passed | passed | passed | passed |
|  | Substrate Test | passed | passed | Passed | passed | passed | passed | not passed |
| Dimensional stability 1 (70° C., 24 hr) |  | −0.03% | −0.03% | −0.03% | −0.06% | −0.06% | −0.10% | −0.10% |
| Dimensional stability 2 (45° C., 95% RH, 96 hr) |  | +0.01% | +0.01% | +0.01% | +0.03% | +0.04% | +0.05% | +0.02% |
| Impact-resistance (Dropping test with 67 g iron ball) |  | 900 mm | 900 mm | 900 mm | 900 mm | 900 mm | 200 mm | 900 mm |
| Thickness |  | 1.5 mm | 1.5 mm | 1.5 mm | 4.5 mm | 4.5 mm | 4.5 mm | 1.5 |
| Min. radius of curvature (R) |  | 30 mm | 30 mm | 30 mm | 70 mm | 70 mm | 1200 mm | 30 mm |

In the above table, fire-resistance data represent results of a test carried out in accordance with "Testing method for incombustibility of internal finish materials and elements of building" as set forth in KS F2271, and the dimensional stability data represent results of a test carried out according to "Testing method for laminated thermosetting high-pressure decorative sheets" as set forth in JIS K 6902.

Further, the minimum radius of curvature represents the radius of curvature (R) of the decoration layer measured in such a way that the panel was held by both ends and the ends were pulled together to bend the decoration layer until it just resisted breakage.

The fire-resistant composite panel and the fire-resistant decorative composite panel prepared by using loess according to the present invention comprise a substrate layer integrally formed with a compound of a melamine resin, a phenol resin, or a modified resin, which includes loess, and a porous sheet such as a woven or nonwoven fabric made of inorganic fibers, for example glass or alumina fibers, or kraft paper as main inorganic fillers, with the addition of a fire retardant. They also comprise an aluminum sheet or a galvanized steel plate as a rear reinforcing layer, and the resulting panels have superior dimensional stability and impact-resistance. Therefore, the composite panel according to the invention can be used in various applications such as for interior materials for passenger cars, interior materials for ships and automobiles, materials for building interiors or exteriors, material for interiors, furniture and floors; and furthermore, the fire-resistant composite panel has excellent fire-resistance and impact-resistance as well as a low dimensional change and good workability to form a curvature.

What is claimed is:

1. A fire-resistant composite panel comprising:
    a) a substrate layer formed by impregnating or coating a substrate material of a woven or nonwoven fabric of inorganic fiber, or a paper, with a resin compound which contains an inorganic filler having loess as a main component and a thermosetting resin selected from the group consisting of a phenol resin, a modified phenol resin, a modified phenol-urea resin, a melamine resin, and a modified melamine resin; and
    b) a rear layer of an aluminum sheet or a galvanized steel plate.

2. A fire-resistant composite panel according to claim 1, wherein a reinforcing layer formed by impregnating or coating a woven inorganic fiber or kraft paper with a resin compound of a modified melamine resin or a modified phenol resin is interposed between substrate layers or between the substrate layer and the rear layer of the composite panel.

3. A fire-resistant composite panel according to claim 1, wherein the amount of the resin compound impregnated into the substrate layer is 400 to 2000 parts by weight with reference to 100 parts by weight of the substrate material.

4. A fire-resistant composite panel according to claim 1, wherein the resin compound comprises:
    i) 3.0% to 10.0% by weight (based on solid mass) of a first condensate of a melamine resin or a phenol resin which is produced by reaction of 25% to 45% by weight of melamine or phenol, 30% to 60% by weight of formaldehyde, 2% to 5% by weight of a plasticizer, and 10% to 25% by weight of water;
    ii) 50% to 80% by weight of loess;
    iii) 1.0% to 5.0% by weight of fire retardant; and
    iv) 10% to 40% by weight of water or alcohol as a solvent.

5. A fire-resistant composite panel according to claim 1, wherein the resin compound comprises:
    i) 3.0% to 10.0% by weight (based on solid mass) of a first condensate of a melamine resin or a phenol resin which is produced by reaction of 25% to 45% by weight of melamine or phenol, 30% to 60% by weight of formaldehyde, 2% to 5% by weight of a plasticizer, and 10% to 25% by weight of water;
    ii) 40% to 70% by weight of loess;

iii) 3% to 20% by weight of one or more inorganic fillers selected from the group consisting of aluminum hydroxide, magnesium hydroxide and talc;
iv) 1.0% to 5.0% by weight of fire retardant; and
v) 10% to 40% by weight of water or alcohol as a solvent.

6. A fire-resistant decorative composite panel according to claim 1, wherein the loess has a particle size distribution of 5 to 300 μm and a mean particle size of 10 to 50 μm.

7. A fire-resistant composite panel according to claim 1, wherein production areas of the loess in Korea include Sancheong in Gyeongsangnam-do, Chongdo in Gyeongsangbuk-do, Gurye or Hwasun in Jeollanam-do, and Buan in Jeollabuk-do.

8. A fire-resistant composite panel according to claim 1, wherein the loess has a composition of:
10% to 90% by weight of silicon dioxide, 10% to 80% by weight of aluminum oxide, 0.1% to 50% by weight of iron oxide, 0.1% to 30% by weight of magnesium oxide, 0.1% to 50% by weight of calcium oxide, 0.1% to 30% by weight of potassium oxide, 0.1% to 5% by weight of mineral oxide and inorganic material, 0% to 5% by weight of moisture and 0.1% to 20% by weight of impurities as a remainder.

9. A fire-resistant composite panel according to claim 1, wherein the loess is calcined loess obtained by calcining natural loess at a temperature of 300° to 1000° C.

10. A fire-resistant composite panel according to claim 1, wherein the substrate material of the substrate layer is a woven or nonwoven fabric of glass fiber or alumina fiber, or kraft paper, and has a weight per unit area of 30 to 200 g/m$^2$.

11. A fire-resistant composite panel according to claim 10, wherein the substrate material is a nonwoven fabric of glass fiber that is made by chopping a glass fiber having a composition of E-glass with a fiber diameter of 6 to 30 μm into a length of 10 to 50 mm using a needling machine, and then by blending a binder selected from the group consisting of an epoxy resin, an acryl resin, and a polyvinyl alcohol resin with it.

12. A fire-resistant composite panel according to claim 2, wherein the amount of the resin compound impregnated into the reinforcing layer is 50 to 500 parts by weight with reference to 100 parts by weight of the substrate material.

13. A fire-resistant composite panel according to claim 2, wherein the resin compound comprises:
i) 3.0 to 10.0 parts by weight of a first condensate of a melamine resin or a phenol resin which is produced by reaction of 25% to 45% by weight of melamine or phenol, 30% to 60% by weight of formaldehyde, 2% to 5% by weight of a plasticizer and 10% to 25% by weight of water;
ii) 1.0 to 5.0 parts by weight of fire retardant; and
iii) 10 to 40 parts by weight of water or alcohol as a solvent.

14. A fire-resistant composite panel according to claim 2, wherein the resin compound comprises:
i) 3.0% to 10.0% by weight (based on solid mass) of a first condensate of a melamine resin or a phenol resin which is produced by reaction of 25% to 45% by weight of melamine or phenol, 30% to 60% by weight of formaldehyde, 2% to 5% by weight of a plasticizer and 10% to 25% by weight of water;
ii) 50% to 80% by weight of loess;
iii) 1.0% to 5.0% by weight of fire retardant; and
iv) 10% to 40% by weight of water or alcohol as a solvent.

15. A fire-resistant composite panel according to claim 2, wherein the resin compound comprises:
i) 3.0% to 10.0% by weight (based on solid mass) of a first condensate of a melamine resin or a phenol resin which is produced by reaction of 25% to 45% by weight of melamine or phenol, 30% to 60% by weight of formaldehyde, 2% to 5% by weight of a plasticizer and 10% to 25% by weight of water;
ii) 40% to 70% by weight of loess;
iii) 3% to 20% by weight of an inorganic filler selected from the group consisting of aluminum hydroxide, magnesium hydroxide and talc;
iv) 1.0% to 5.0% by weight of fire retardant; and
v) 10% to 40% by weight of water or alcohol as a solvent.

16. A fire-resistant composite panel according to claim 2, wherein the substrate material of the reinforcing layer is woven fabric of glass fiber or alumina fiber having a weight per unit area of 30 to 150 g/m$^2$.

17. A fire-resistant composite panel according to claim 16, wherein the substrate material is woven glass fiber fabric made of glass fiber having an E-glass composition produced by means of a weaving machine.

18. A fire-resistant composite panel according to claim 2, wherein the substrate material of the reinforcing layer is kraft paper having a weight per unit area of 70 to 300 g/m$^2$.

19. A fire-resistant composite panel according to claim 1, wherein a surface of the rear layer is coated with a thermosetting resin.

20. A fire-resistant composite panel according to claim 1, wherein the thickness of the rear layer is in the range of 0.5 to 2.0 mm.

21. A fire-resistant decorative composite panel comprising:
a) a decoration layer formed by impregnating or coating a patterned substrate with a thermosetting resin;
b) a substrate layer formed by impregnating or coating a substrate material of a woven or nonwoven fabric of inorganic fiber, or a paper, with a resin compound which contains an inorganic filler having loess as a main component and a thermosetting resin selected from the group consisting of a phenol resin, a modified phenol resin, a modified phenol-urea resin, a melamine resin, and a modified melamine resin; and
c) a rear layer of an aluminum sheet or a galvanized steel plate.

22. A fire-resistant decorative composite panel according to claim 21, wherein a reinforcing layer formed by impregnating or coating a woven inorganic fiber fabric or kraft paper with a resin compound of a modified melamine resin or a modified phenol resin is interposed between the substrate layer and the decoration layer, between substrate layers or between the substrate layer and the rear layer of the decorative composite panel.

23. A fire-resistant decorative composite panel according to claim 21, wherein the amount of the thermosetting resin impregnated into the decoration layer is 50 to 200 parts by weight with reference to 100 parts by weight of the patterned substrate.

24. A fire-resistant decorative composite panel according to claim 1, wherein the thermosetting resin is selected from the group consisting of a melamine resin, a phenol resin, an acryl resin, and a urethane resin.

25. A fire-resistant decorative composite panel according to claim 1, wherein the patterned substrate is a paper having a weight per unit area of 40 to 200 g/m$^2$, the material of which is selected from the group consisting of synthetic pulp, wood, textile fabrics and organic synthetic fiber.

26. A fire-resistant decorative composite panel prepared by superposing from top to bottom:

a) a decoration layer formed by impregnating or coating a patterned substrate with a thermosetting resin;

b) 1 to 5 substrate layers formed by impregnating or coating a substrate material of a woven or nonwoven fabric of inorganic fiber, or a paper, with a resin compound which contains an inorganic filler having loess as a main component and a thermosetting resin selected from the group consisting of a phenol resin, a modified phenol resin, a modified phenol-urea resin, a melamine resin, and a modified melamine resin; and c) a rear layer of an aluminum sheet or a galvanized steel plate with a thermosetting resin coated on its surface, and then by forming it to be integrated by heat-pressing.

27. A fire-resistant decorative composite panel prepared by superposing from top to bottom:

a) a decoration layer formed by impregnating or coating a patterned substrate with a thermosetting resin;

b) 1 to 5 substrate layers formed by impregnating or coating a substrate material of a woven or nonwoven fabric of inorganic fiber, or a paper, with a resin compound which contains an inorganic filler having loess as a main component and a thermosetting resin selected from the group consisting of a phenol resin, a modified phenol resin, a modified phenol-urea resin, a melamine resin, and a modified melamine resin;

c) 1 to 12 reinforcing layers formed by impregnating or coating a woven inorganic fiber fabric or kraft paper with a resin compound of a modified melamine resin or a modified phenol resin; and d) a rear layer of an aluminum sheet or a galvanized steel plate with a thermosetting resin coated on its surface, and then by forming it to be integrated by heat-pressing.

28. A fire-resistant decorative composite panel prepared by superposing from top to bottom:

a) a decoration layer formed by impregnating or coating a patterned substrate with a thermosetting resin;

b) 1 to 12 reinforcing layers formed by impregnating or coating a woven inorganic fiber fabric or kraft paper with a resin compound of a modified melamine resin or a modified phenol resin;

c) 1 to 5 substrate layers formed by impregnating or coating a substrate material of a woven or nonwoven fabric of inorganic fiber, or a paper, with a resin compound which contains an inorganic filler having loess as a main component and a thermosetting resin selected from the group consisting of a phenol resin, a modified phenol resin, a modified phenol-urea resin, a melamine resin and, a modified melamine resin; and d) a rear layer of an aluminum sheet or a galvanized steel plate with a thermosetting resin coated on its surface, and then by forming it to be integrated by heat-pressing.

29. A fire-resistant decorative composite panel prepared by superposing from top to bottom:

a) a decoration layer formed by impregnating or coating a patterned substrate with a thermosetting resin;

b) 1 to 5 substrate layers formed by impregnating or coating a substrate material of a woven or nonwoven fabric of inorganic fiber, or a paper, with a resin compound which contains an inorganic filler having loess as a main component and a thermosetting resin selected from the group consisting of a phenol resin, a modified phenol resin, a modified phenol-urea resin, a melamine resin, and a modified melamine resin;

c) 1 to 12 reinforcing layers formed by impregnating or coating a woven inorganic fiber fabric or kraft paper with a resin compound of a modified melamine resin or a modified phenol resin;

d) 1 to 5 substrate layers formed by impregnating or coating a substrate material of a woven or nonwoven fabric of inorganic fiber, or a paper, with a resin compound which contains an inorganic filler having loess as a main component and a thermosetting resin selected from the group consisting of a phenol resin, a modified phenol resin, a modified phenol-urea resin, a melamine resin, and a modified melamine resin; and e) a rear layer of an aluminum sheet or a galvanized steel plate with a thermosetting resin coated on its surface, and then by forming it to be integrated by heat-pressing.

30. A fire-resistant decorative composite panel prepared by superposing from top to bottom:

a) a decoration layer formed by impregnating or coating a patterned substrate with a thermosetting resin;

b) 1 to 12 reinforcing layers formed by impregnating or coating a woven inorganic fiber fabric or kraft paper with a resin compound of a modified melamine resin or a modified phenol resin;

c) 1 to 5 substrate layers formed by impregnating or coating a substrate material of a woven or nonwoven fabric of inorganic fiber, or a paper, with a resin compound which contains an inorganic filler having loess as a main component and a thermosetting resin selected from the group consisting of a phenol resin, a modified phenol resin, a modified phenol-urea resin, a melamine resin, and a modified melamine resin;

d) 1 to 12 reinforcing layers formed by impregnating or coating a woven inorganic fiber fabric or kraft paper with a resin compound of a modified melamine resin or a modified phenol resin; and e) a rear layer of an aluminum sheet or a galvanized steel plate with a thermosetting resin coated on its surface, and then by forming it to be integrated by heat-pressing.

* * * * *